United States Patent Office 2,755,657

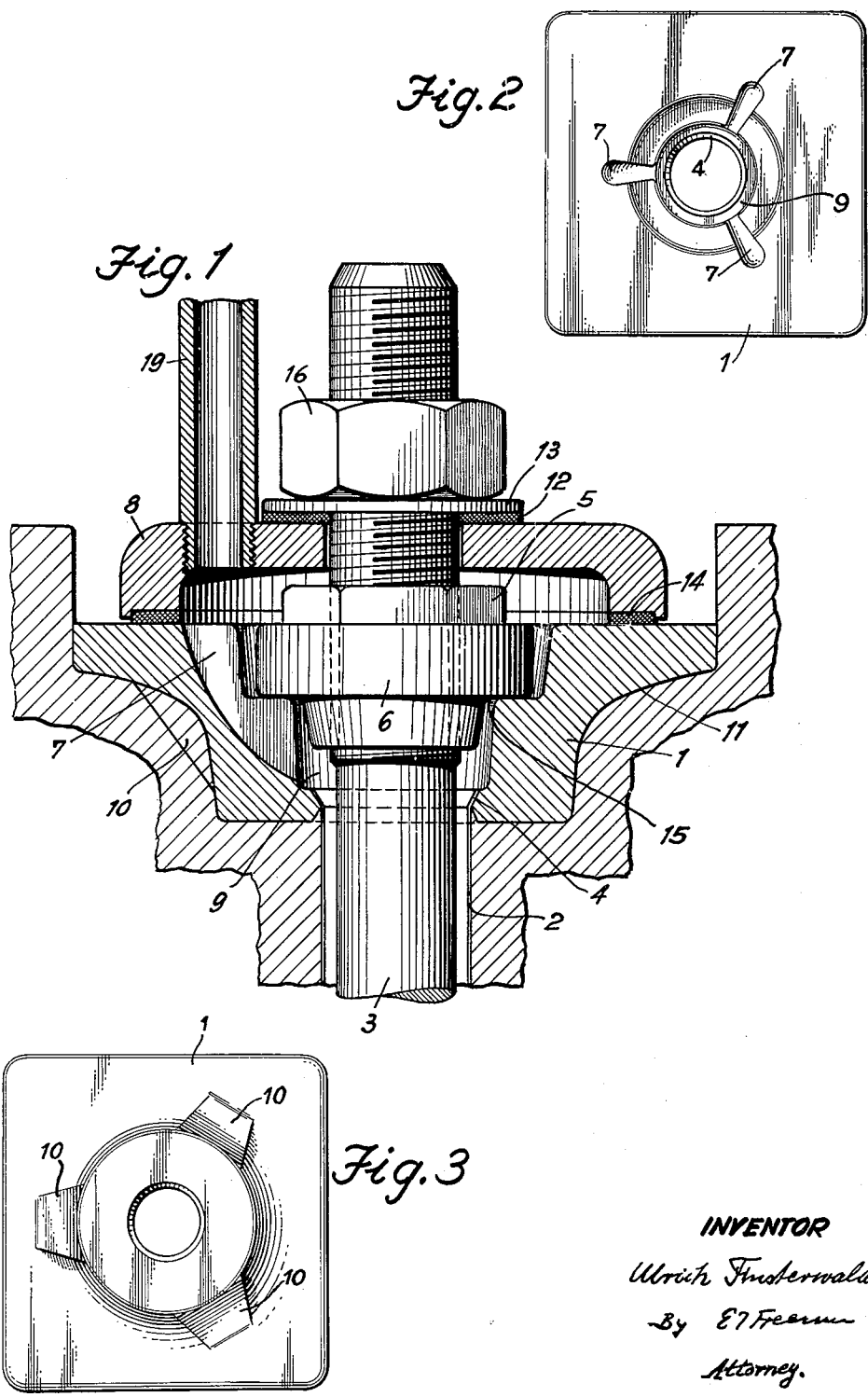

Patented July 24, 1956

2,755,657

POST-STRESSED REINFORCING ROD ANCHOR

Ulrich Finsterwalder, Munich, Germany

Application November 29, 1952, Serial No. 323,253

Claims priority, application Germany November 29, 1951

4 Claims. (Cl. 72—50)

The invention relates to anchoring means for the ends of pre-tensioned threaded reinforcing rods in steel-concrete constructions of the type consisting of an anchor plate and a nut screwed onto a threaded part of the reinforcing rod.

Hitherto, screw threaded nuts of ordinary form and simple square anchor plates of uniform thickness have generally been used for anchoring purposes. As a protection, two nuts are usually screwed on in superimposed relationship while, after the stressing of the rods which are disposed, for example, within thin pipes, washers are inserted between the said anchor plate and the nuts in order to be able to make a bond between the reinforcement and the concrete by pressing a cement wet mix or other setting medium into the cavities around the nuts and rod. These washers are provided with recesses, in order that the injected mix may be pressed into the pipe by means of a dish shaped cover which is screwed onto the end of the rod and is joined to the anchor plate.

In constructions of this kind, which have in themselves proved quite satisfactory, the following disadvantages still exist:

Due to the great thickness of the anchor plate and the use of the two superimposed nuts, the pretension force is applied at a considerable spacing, measured from the exterior of the component. In many cases, however, it is desired to apply the pre-tension force as closely as possible to the exterior of the construction. There is also the fact that an anchor plate of the thickness concerned involves a large expenditure of material. The use of washer-shaped auxiliary means for the injection is objectionable, because after such initial use it has no further objective and is thus wasted for all practical purposes. The turns of the thread of a normal screw are very unevenly strained. Further, although the necessary security can be obtained by screwing on a second nut, a certain amount of slip, which decreases the tensioning force, still occurs.

The present invention presents a solution which eliminates these disadvantages mentioned, and consists in constructing the anchoring nut as a collar nut, the collar of which abuts against a projection in the anchor plate hole, through which hole the reinforcing rods are passed, and projects beyond the front or end surface of the anchor plate either not at all or merely just enough for operation of its hexagonal head by which the nut is turned.

At its outer periphery, which is to be embedded in the concrete, the anchor plate may be chamfered, said chamfered part extending throughout the complete circumference of the plate and having in cross-section approximately the shape of a quadrant.

A shallow dish shaped cover may be inverted over the anchor plate. This cover has a hole, through which the reinforcing rod may be passed and an orifice for the injection of the cement or other wet mix for the enveloping pipe; further it may be sealed against the anchor plate preferably by means of a packing ring.

In the wall of the anchor plate internal slots may be provided for assisting in the dispersion of the setting medium appropriately in the hole of the plate. On the outer face of the anchor plate there are preferably provided strengthening members for the plate, preferably in the form of ribs, collars, or the like in the regions of the internal slots.

In accordance with the present invention the anchoring force is distributed fairly uniformly over the individual thread turns, which place the inner part of the nut under a substantially similar tensile strain to that of the rod itself.

A normal nut is subject practically completely to compressive stress. As a result, substantially only the first turn of the thread transmits the force and only after the yield point of this part has been overcome does the next turn of the thread become effective.

The outer surface with which the anchor plate is seated in the concrete is echeloned into two part surfaces by the chamfering of the outer surface of the plate, where it is required to be embedded in the concrete. This ensures that the anchoring force is introduced into the concrete in two successive stages and is more uniformly distributed onto the concrete, so that the external dimensions of the anchor plate may be reduced by approximately 30% as compared with the known construction. This in turn permits a reduction of the weight of the anchor plate to less than half of that hitherto customary. Decrease of the external dimensions of the plate is constructionally of great importance, since there is always a shortage of space at the anchoring points. Furthermore, the decrease in weight results in a corresponding saving in cost, and as a result of the invention, anchor plates may be produced cheaply by pressing.

Since both the collar nut and the anchor plate may be manufactured with great precision as pressed parts, there automatically occurs, through the sinking of the nut into the anchor plate, a centering of the reinforcing rod within the enveloping pipe. Furthermore, the favorable position of the collar nut within the anchor plate enables a simple, spot-shaped welding of the collar nut to be effected to the plate, which welding functions to provide a temporary connection at the time of fitting. The welding can be destroyed again by turning the nut with the aid of a wrench after the anchor plate has been firmly embedded in position.

The invention will now be described more in detail and with reference to the accompanying drawings, wherein:

Fig. 1 is a vertical cross-sectional view of the instant anchor plate;

Fig. 2 is a top view; and

Fig. 3 is a bottom view thereof.

As shown in the drawings, one end of a steel rod 3, located within a pipe 2, is provided with a thread which may be produced, for example, by cold rolling. The anchor consists of an anchor plate 1 and a nut 6, which engages with the thread of the steel rod 3. The nut 6 abuts with its collar-shaped projection 15 against a shoulder of the slightly conically extending wall of a hole 9 provided in the anchor plate. By this means the major part of the nut is disposed within the anchor plate. The nut 6 projects with its hexagonal head 5, which is of reduced size compared with the collar, merely to such an extent beyond the outer end or front surface of the anchor plate that it may be adjusted during the tensioning of the rod 3.

On its outer peripheral surface, the anchor plate has a chamfer 11 which extends over the whole of its circumference and has in cross-section approximately the shape of a quarant. The provision of slots 7 in the inner wall of the plate 1 forming the boundary wall of the hole 9 makes it possible to press a cement or other wet mix for a setting medium in a satisfactory manner from the outside into the cavity between the steel rod and the pipe 2 enveloping it, which is embedded in the concrete. Since, as in the illustrated construction, three comparatively large dimensioned slots 7 may be provided in symmetrical arrangment, and the hole 9 may be made of adequate width, the cement wet mix or other medium, before setting, may penetrate uniformly over the entire cross-section into the cavity between the enveloping pipe 2 and the steel rod 3.

At the parts of the plate 1 where material is removed to form the slots 7, there are disposed on the outer periphery of the anchor plate strengthening members 10 in the form of collars, ribs, or the like, which border the slots.

An inverted shallow dish shaped cover 8 is adapted to shroud the collar nut 6 and a packing ring 14 is interposed between the cover and the plate 1 for sealing purposes.

The dish shaped cover 8 is held against the anchor plate 1 by a nut 16 screwed onto the end of the steel rod 3 with the interposition of a packing ring 12 and a bearing plate 13 between the nut 16 and the cover 8. The introduction of the cement or other setting medium is effected through a mouthpiece formed by a pipe 19 secured to the dish shaped cover 8.

Conveniently the enveloping pipe 2 is connected to the anchor plate by flaring or splaying its end over a complementary shoulder 4 in the anchor plate.

What I claim is:

1. A masonry structure having a reinforcing rod extending therethrough and having a threaded upper portion, and an anchorage device engaging said rod and said masonry structure, said anchorage device comprising a plate-shaped member embedded in said structure and having a flat upper surface, a center aperture in said member and said reinforcing rod extending therethrough, said member having an inwardly projecting circular shoulder in said aperture, a nut in engagement with the threaded upper portion of said rod, said nut having an integral collar-shaped extension bearing against the shoulder of said member, a dish-shaped cover resting on the upper surface of said member, said cover having a center aperture and said rod extending therethrough, a tube in said cover for permitting delivery of a setting mixture into said member, and means on said rod pressing said cover against the upper surface of said member.

2. In a concrete structure having a threaded reinforcing rod extending therethrough, an anchorage device engaging the rod and structure, said anchorage device comprising a substantially dish-shaped member embedded in said structure and having a flat upper surface, a center aperture in said member and said rod extending therethrough, said member having an inwardly projecting circular shoulder in said aperture, a nut in screw-thread engagement with the rod and having an integral collar-shaped extension bearing against the shoulder of said member, a dish-shaped cover resting on the upper surface of said member, a second nut in engagement with the rod pressing said cover against said member, and a packing ring disposed between said cover and said upper surface providing a seal therebetween, and said member being chamfered at its outer surface.

3. In combination with a concrete structure having a reinforcing rod extending therethrough, an anchorage device engaging said rod and said structure, said device comprising a plate-shaped member embedded in said structure and having a center aperture said rod passing therethrough, said rod having a threaded upper portion, said member having an inwardly projecting circular shoulder in said aperture, and a nut in screw-thread engagement with said rod and having an integral collar coacting with and pressing against the shoulder in said aperture, said member being chamfered at its outer circumference, said shoulder having slots therein for conducting cementitious filler from one side of said shoulder to the other.

4. In combination with a concrete structure having a partially threaded reinforcing rod extending therethrough, an anchorage device engaging said rod and said structure, said anchorage device comprising an anchoring plate embedded in said structure and having a flat upper bearing surface, a center aperture in said plate receiving said rod, said plate having an inwardly projecting circular shoulder in said aperture, a nut engaging the threads on said rod and pressing against the shoulder in said aperture, said plate having a chamfer on its outer surface said chamfer being substantially of quadrant shape in cross-section, said shoulder having slots therein for conveying a setting mixture from one side of the shoulder to the other having reinforcing ribs on its outer surface, said ribs being disposed opposite said slots.

References Cited in the file of this patent

UNITED STATES PATENTS

| | | |
|---|---|---|
| 1,201,989 | Stafford et al. | Oct. 17, 1916 |
| 1,978,229 | Sass et al. | Oct. 23, 1934 |
| 2,371,882 | Freyssinet | Mar. 20, 1945 |
| 2,590,685 | Coff | Mar. 25, 1952 |

FOREIGN PATENTS

| | | |
|---|---|---|
| 338,864 | Great Britain | Nov. 18, 1930 |
| 556,570 | Great Britain | Oct. 11, 1943 |
| 273,004 | Switzerland | Apr. 16, 1951 |